United States Patent [19]

Sarver

[11] Patent Number: 4,756,751
[45] Date of Patent: Jul. 12, 1988

[54] METHOD FOR PREPARING HOT METAL CHARGE FOR CONVERSION INTO STEEL

[76] Inventor: Allan J. Sarver, 3010 Meadowbrook Rd., Murrysville, Pa. 15668

[21] Appl. No.: 843,904

[22] Filed: Mar. 25, 1986

[51] Int. Cl.$^4$ .............................................. C21C 1/00
[52] U.S. Cl. .......................................... 75/41; 75/43; 75/44 S; 75/45; 75/46; 75/48
[58] Field of Search ................... 75/41, 46, 48, 45, 43, 75/44 S

[56] References Cited

U.S. PATENT DOCUMENTS 3,960,547  6/1976  Kirkpatrick et al. .................... 75/46

Primary Examiner—Melvyn J. Andrews
Attorney, Agent, or Firm—Kirkpatrick & Lockhart

[57] ABSTRACT

A process for constituting the molten metal portion of a charge to a steelmaking furnace comprising the steps of melting high metallic scrap; raising the temperature of the molten scrap to about 2800° F.; and combining the molten scrap with hot metal from a blast furnace in a weight ratio wherein the molten scrap component is roughly equivalent to the weight percent of carbon in the hot metal historically lost in transit from the blast furnace to the steelmaking furnace.

2 Claims, No Drawings

METHOD FOR PREPARING HOT METAL CHARGE FOR CONVERSION INTO STEEL

BACKGROUND OF THE INVENTION

1. Field of the Invention

This invention relates to an improved process for preparing the hot metal portion of the charge to a steelmaking process; more particularly, to a process for substituting molten scrap for a portion of the molten blast furnace iron typically used to formulate the charge to a steelmaking process.

2. Description of the Prior Art

Modern steelmaking processes, such as the basic oxygen process (BOP) and more recently the bottom blowing process known as Q-BOP, still consume large quantities of molten iron (hot metal) produced by the conventional blast furnace. In most steel plants, the hot metal portion of the metallic charge to the steelmaking furnace is about 70%, with the balance cold or preheated scrap. Any adverse changes that may occur to the hot metal between the time it is cast at the blast furnace and the time it is charged to the steelmaking furnace are the subject of concern to the steelmaker.

Hot metal must be conveyed from the blast furnace to the steel plant in some type of container, often a refractory lined vessel known as a submarine ladle. Despite recent efforts toward conserving the sensible heat of the hot metal during periods of transit, storage or transfer from one container to another, a certain amount of temperature loss is inevitable; typically, this amount is in the range of 350° F. to 375° F. As the temperature of the hot metal decreases, carbon in the solution in the metal is precipitated according to well-known principles and is expelled as kish. In a typical situation, where the hot metal is cast at the blast furnace at a temperature of about 2775° F. and is charged to the steelmaking vessel at 2400° F., the temperature loss of 375° F. results in a carbon loss of about twelve percent, e.g., from 5.10% C. to 4.50% C.

Carbon, of course, is the primary source of oxidizable fuel in the hot metal. The reaction between carbon in the hot metal and the gaseous oxygen used in pneumatic steelmaking processes is highly exothermic and thus permits the process to be autogenous. A loss of carbon on the order of twelve percent in hot metal produced by a blast furnace is therefore a very expensive loss.

There exists, therefore, a need to minimize carbon loss in hot metal, given the almost inevitable temperature loss that will occur between the blast furnace and the steelmaking vessel.

SUMMARY OF THE INVENTION

The present invention provides a process for constituting the molten metal portion of a charge to a steelmaking furnace comprising the steps of: (a) melting high metallic scrap; (b) raising the temperature of the molten scrap to about 2800° F.; and combining the molten scrap with hot metal from a blast furnace in a weight ratio wherein the molten scrap component is roughly equivalent to the weight percent of carbon in the hot metal historically lost in transit from the blast furnace to the steelmaking furnace. The term "historically lost" means the average carbon loss (expressed in weight percent) in a vessel of hot metal between the time of casting at the blast furnace and the time of charging to the steelmaking furnace, calculated over an immediately preceding period of say one or two months when hot metal handling practice was stabile. Hot metal is routinely sampled and analyzed at both of the times used to determine carbon loss so the records for making the calculation are readily available to the steelmaker. If the invention is to be used in a new steelmaking facility, computer simulations are available to make the calculation based on a projected temperature loss in the hot metal.

The principle employed in the present invention is the recognition that, according to the classic iron-carbon diagram, the solubility of carbon in iron decreases with a decrease in temperature. By immediately diluting the hot metal with relatively low carbon molten metal scrap, the molten mixture does not become saturated with carbon as the temperature decreases before the molten mixture is charged to the steelmaking furnace; there is no tendency, therefore, for carbon to precipitate. Ideally, the molten mixture prepared in accordance with the present invention will have a carbon content at the time of charging to the steelmaking furnace substantially equal to the carbon content of hot metal at that stage under former practice, i.e., about 4.50% carbon. The advantage of maintaining former carbon levels, of course, is that the refining operations in the steelmaking furnace do not require modification in respect of carbon removal.

Numerous other advantages are attendant in the present invention. Among those advantages, as detailed hereinafter, are (i) a decrease in the quantity of oxygen required in refining; (ii) a reduction in the volume of slag produced during refining; (iii) a decrease in tap-to-tap time in refining operations; and (iv) an increase in metallic yield of steel produced.

DESCRIPTION OF THE PREFERRED EMBODIMENTS

Scrap, preferably debris type scrap high in metallic values, is charged to a scrap melter and melted; the temperature of the molten scrap is then raised to about 2800° F. Any conventional melting apparatus, such as a channel induction furnace (see e.g. U.S. Pat. No. 3,595,979), may be used as a scrap melter. Typically, the molten scrap will have the following composition:

| Constituent | Weight Percent |
| --- | --- |
| Metallics | 99.25 |
| Carbon | 0.10 |
| Silcon | 0.02 |
| Manganese | 0.60 |
| Phosphorus | 0.015 |
| Sulfur | 0.015 |

The molten scrap is charged to the container used to transport hot metal from the blast furnace to the steel plant, such as a conventional submarine ladle, before the container is placed at the blast furnace for filling with hot metal. The amount of molten scrap charged is that amount which, when combined with hot metal to reach the normal capacity of the transport container, is roughly equivalent in weight (compared to the total) to the carbon loss historically experienced in hot metal. For example, if the historical carbon loss is 12%, the molten scrap component of the molten mixture in the container would be about 12% by weight.

Hot metal from the blast furnace, at a temperature in the range of 2750° to 2775° F. is cast into the container to the normal fill level. Typically, the composition of the hot metal is:

| Constituent | Weight Percent |
| --- | --- |
| Metallics | 92.86 |
| Carbon | 5.10 |
| Silicon | 1.00 |
| Manganese | 0.90 |
| Phosphorus | 0.090 |
| Sulfur | 0.050 |

The molten mixture is then transported to the steel plant, using normal handling procedures, and eventually is charged into the steelmaking furnace.

Table I illustrates a comparison between the present invention and the conventional hot metal practice:

TABLE I

| Metal Condition | Composite Mixture Of Present Invention At the Blast Furnace | Composite Mixture of Present Invention As Charged To Steelmaking Furnace | Hot Metal Used In Prior Practice As Charged To Steelmaking Furnace |
| --- | --- | --- | --- |
| Temperature (°F.) | 2750–2775 | 2400 | 2400 |
| Metallics (Wt. %) | 93.63 | 93.63 | 93.50 |
| Carbon (Wt. %) | 4.50 | 4.50 | 4.50 |
| Silicon (Wt. %) | 0.88 | 0.88 | 1.00 |
| Manganese (Wt. %) | 0.86 | 0.86 | 0.90 |
| Phosphorus (Wt. %) | 0.080 | 0.080 | 0.09 |
| Sulfur (Wt. %) | 0.046 | 0.015* | 0.015* |

*Desulfurized

Comparing columns two and three of Table I, it may be seen that conventional charging temperature, metallics content and carbon content of the molten metal charged to the steelmaking furnace are preserved in the practice of the present invention. As alluded to above, this has the advantage of maintaining well-established refining practice. Further, in the present invention, the concentrations of oxidizable elements (silicon, manganese, phosphorus) are reduced compared with conventional practice. On the one hand, this reduction decreases the slag volume, oxygen consumption and tap-to-tap time, all of which are beneficial; on the other hand, the reduction of oxidizable elements, particularly silicon, reduces the quantity of scrap that can be charged in the refining operation because silicon oxidation is also highly exothermic. However, in view of the fact that a significant amount of molten scrap makes up the molten metal portion of the charge (e.g., twelve percent in the above example), there is a net scrap consumption increase (nine percent in the example) at the current molten metal/scrap ratio of 70/30 observed in the basic oxygen process.

Table II below summarizes the advantages of the present invention over conventional hot metal practice when the steelmaking process is the basic oxygen process and the historical carbon loss in the hot metal is twelve percent:

TABLE II

| Blast furnace hot metal carbon savings | Approximately | 12% |
| --- | --- | --- |
| Blast furnace hot metal usage | Approximately | 9% |

TABLE II-continued

| reduction per BOP heat | | |
| --- | --- | --- |
| Oxygen reduction per BOP heat | Approximately | 60 ft. 3/ton |
| Slag volume reduction per BOP heat | Approximately | 41 lbs./ton |
| Tap to tap time reduction per BOP heat | Approximately | ¾ min./heat |
| Metallic yield improvement per BOP heat | | |
| (a) due to increased charge metallics | Approximately | 0.15% |
| (b) due to decreased slag volume | Approximately | 0.35% |
| Approximate Total | | 0.50% |

What is claimed is:

1. A process for constituting the molten metal portion of a charge to a steelmaking furnace comprising the steps of:
   (a) melting high metallic scrap;
   (b) raising the temperature of the molten scrap to about 2800° F.;
   (c) tapping hot metal from a blast furnace;
   (d) combining said molten scrap with said hot metal in a weight ratio wherein the molten scrap component of the molten scrap and hot metal combination is roughly equivalent to the weight percent of carbon in the hot metal historically lost in transit from the blast furnace to said steelmaking furnace; and
   (e) transporting the molten scrap and hot metal combination to said steelmaking furnace.

2. A process for compensating for the loss of carbon in hot metal during transit from a blast furnace to a steelmaking furnace comprising the steps of:
   (a) melting high metallic scrap;
   (b) raising the temperature of the molten scrap to about 2800° F.;
   (c) tapping hot metal from said blast furnace;
   (d) adding to said molten scrap said hot metal to form a combined molten mixture, said molten scrap component of said combined molten mixture being present in a weight percent of the total weight of said molten mixture that is roughly equivalent to the weight percent of carbon in the hot metal historically lost in transmit from said blast furnace to said steelmaking furnace; and
   (e) transporting said combined molten mixture to said steelmaking furnace.

* * * * *